(12) United States Patent
Perlich et al.

(10) Patent No.: US 6,773,611 B2
(45) Date of Patent: Aug. 10, 2004

(54) METHODS, APPARATUS, AND COMPOSITIONS FOR CONTROLLING ORGANISMS IN BALLAST WATER

(75) Inventors: Tom Perlich, Birmingham, AL (US); Charles Goodsill, Hamilton, NY (US)

(73) Assignee: Ecochlor, Inc., Hamilton, NY (US)

( * ) Notice: Subject to any disclaimer, the term of this patent is extended or adjusted under 35 U.S.C. 154(b) by 177 days.

(21) Appl. No.: 09/996,135

(22) Filed: Nov. 28, 2001

(65) Prior Publication Data

US 2004/0129645 A1 Jul. 8, 2004

Related U.S. Application Data

(60) Provisional application No. 60/253,650, filed on Nov. 28, 2000, and provisional application No. 60/282,542, filed on Apr. 9, 2001.

(51) Int. Cl.[7] ............................... C02F 1/50; C02F 1/76
(52) U.S. Cl. .................. 210/758; 210/764; 210/143; 210/192; 210/198.1; 210/205
(58) Field of Search .................. 210/758, 764, 210/143, 192, 198.1, 205

(56) References Cited

U.S. PATENT DOCUMENTS

| | | | |
|---|---|---|---|
| 684,793 A | 9/1901 | Fuchs et al. | 514/557 |
| 4,414,193 A | 11/1983 | Fredette et al. | 423/478 |
| 5,141,754 A | 8/1992 | Ekis, Jr. et al. | 424/661 |
| 5,256,310 A | 10/1993 | Brooks | 210/747 |
| 5,393,781 A | 2/1995 | Vegega et al. | 514/557 |
| 5,417,987 A | 5/1995 | Dietz et al. | 424/661 |
| 5,468,739 A | 11/1995 | Whitekettle et al. | 514/75 |
| 5,547,584 A | 8/1996 | Capehart | 210/869 |
| 5,550,157 A | 8/1996 | Vegega et al. | 514/557 |
| 5,874,476 A | 2/1999 | Hsu et al. | 514/640 |
| 5,900,157 A | 5/1999 | Petrille et al. | 210/755 |
| 5,979,478 A | 11/1999 | Screptock et al. | 137/3 |
| 6,106,730 A | 8/2000 | Freymark et al. | 210/754 |
| 6,306,281 B1 | 10/2001 | Kelley | 205/556 |

FOREIGN PATENT DOCUMENTS

| | | | |
|---|---|---|---|
| GB | 2 249 306 | 5/1992 | |
| JP | 7-277703 | 10/1995 | |
| WO | PCT/US97/02157 | 2/1997 | C01B/11/02 |

OTHER PUBLICATIONS

Boyiston J. "Ballast Water Management for the Control of Nonindigenous Species", vol. 104, 1996, pp. 391–417.
Oerncke D., "The Treatment of Ships' Ballast Water", Ecoports Monograph. Series No. 18, Mar. 1999, pp. 1–92.

*Primary Examiner*—Betsey Morrison Hoey
(74) *Attorney, Agent, or Firm*—Smith, Gambrell & Russell, LLP

(57) ABSTRACT

Apparatuses and methods of a ballast water treatment system are disclosed. The ballast water treatment system includes a control system and a ballast tank system. The control system controls the concentration of a biocide in the ballast tank system. In addition, the ballast water treatment system can be implemented in a vessel. The ballast water treatment system includes a control system, a biocide generation system, and a ballast tank system. The control system is capable of controlling the concentration of a biocide in the ballast tank system by controlling the amount of the biocide feed into the ballast tank system from the biocide generation system. Further, the ballast water treatment system involves methods for controlling organisms in ballast water of a vessel. A representative method includes providing the ballast water, and treating the ballast water with chlorine dioxide.

30 Claims, 13 Drawing Sheets

FIG. 1A

| | BIO-DEGRADABLE | COST | OTHER COMMENTS |
|---|---|---|---|
| CHLORINE DIOXIDE | HIGHLY BIO-DEGRADABLE | MODERATE | DOES NOT FORM CHLORINATED BY-PRODUCTS |
| SODIUM HYPOCHLORITE/ CALCIUM HYPOCHLORITE | MODERATE FOR BLEACH ITSELF. LOW FOR CHLORINATED BY-PRODUCTS | LOW | STABILITY PROBLEMS' FORMS CHLORINATED BY-PRODUCTS |
| GLUTERALDEHYDE | MODERATELY HIGH AT USE CONCENTRATIONS | MODERATE TO MODERATELY HIGH | ODORS |
| HYDROGEN PEROXIDE | HIGHLY BIO-DEGRADABLE | RELATIVELY LOW | STABILITY, STORAGE, AND HANDLING |
| DRY CHLORINE COMPOUNDS | LOW TO MODERATE | RELATIVELY LOW | DUSTING, HANDLING ISSUES |
| OZONE | HIGHLY BIO-DEGRADABLE | VERY HIGH IN ALL REGARDS | EQUIPMENT EXPENSIVE MAINTENANCE INTENSIVE |
| QUATERNARY AMMONIA COMPOUND | POOR FOR MOST FORMULATIONS | MODERATELY HIGH | FOAMS INACTIVATED BY SOLIDS, SYNERGISTIC WITH C1O2 |
| PERACETIC ACID | HIGHLY BIO-DEGRADABLE | MODERATLEY HIGH | SAFETY AND HANDLING |

FIG. 1B

| | PH | BIOFILM | TOXICITY | CORROSIVENESS |
|---|---|---|---|---|
| CHLORINE DIOXIDE | NEUTRAL | VERY GOOD | NEGLIGABLE AT USE CONCENTRATIONS | NEGLIGABLE AT USE CONCENTRATIONS |
| SODIUM HYPOCHLORITE/ CALCIUM HYPOCHLORITE | ALKALINE | INEFFECTIVE | MAY PRODUCE CHLORINATED BY-PRODUCTS | CORROSIVE TO Fe AND Al |
| GLUTERALDEHYDE | NEGLIGABLE | INEFFECTIVE | MAY CAUSE SEVERE SKIN IRRITATION | MAY CAUSE SEVERE SKIN IRRITATION IN SOME INDIVIDUALS |
| HYDROGEN PEROXIDE | NEUTRAL | INEFFECTIVE | MAY BE EXTREMELY IRRITATING TO SKIN AND TISSUES AT USE CONCENTRATIONS | HIGH ON Fe, Al, and Zn |
| DRY CHLORINE COMPOUNDS | MODERATELY TO HIGH | INEFFECTIVE | MAY PRODUCE CHLORINATED BY-PRODUCTS | CORROSIVE TO Fe and Al |
| OZONE | NEUTRAL | INEFFECTIVE | PROBABLY NEGLIGABLE AT USE CONCENTRATIONS | CORROSIVE TO Fe and Al AT HIGHER CONCENTRATIONS |
| QUATERNARY AMMONIA COMPOUND | ACID TO NEUTRAL | INEFFECTIVE | SKIN AND LUNG IRRITATION | CAN BE CORROSIVE TO Fe, Cu, AND BRASS |
| PERACETIC ACID | NEUTRAL TO ALKALINE | INEFFECTIVE | SEVERE SKIN IRRITATION, CAN CAUSE BLINDNESS | HIGH ON Fe, Al, and Zn |

FIG. 1C

| | EFFICACY | MICROBIAL RANGE | CONTACT TIME | CONCENTRATION |
|---|---|---|---|---|
| CHLORINE DIOXIDE | HIGH | BROAD SPECTRUM EFFECTIVE AGAINST ALL ORGANISMS | SECONDS TO MINUTES | 0.1 PPM TO 5 PPM |
| SODIUM HYPOCHLORITE/ CALCIUM HYPOCHLORITE | MODERATE | INEFFECTIVE AGAINST MANY ORGANISMS | MINUTES TO HOURS | 5PPM TO 100 PPM |
| GLUTERALDEHYDE | MODERATE TO HIGH | SPOROCIDAL | 30 MINUTES TO SEVERAL HOURS | 50 PPM TO 100 PPM |
| HYDROGEN PEROXIDE | LOW | REQUIRES HIGH CONCENTRATIONS, TO ACHIEVE KILL | 15 MINUTES TO SEVERAL HOURS | 500 PPM TO 700 PPM |
| DRY CHLORINE COMPOUNDS | MODERATE | INEFFECTIVE AGAINST MANY ORGANISMS | 30 MINUTES TO SEVERAL HOURS | 5PPM TO 100 PPM |
| OZONE | HIGH | BROAD SPECTRUM EFFECTIVE AGAINST ALL ORGANISMS | SECONDS TO MINUTES | 0.1 PPM TO 10 PPM |
| QUATERNARY AMMONIA COMPOUND | MODERATE TO HIGH | INEFFECTIVE AGAINST MANY ORGANISMS | MINUTES TO SEVERAL HOURS | 30 PPM TO 100 PPM |
| PERACETIC ACID | MODERATE | INEFFECTIVE AGAINST MANY ORGANISMS | 30 MINUTES TO SEVERAL HOURS | 5 PPM TO 100 PPM |

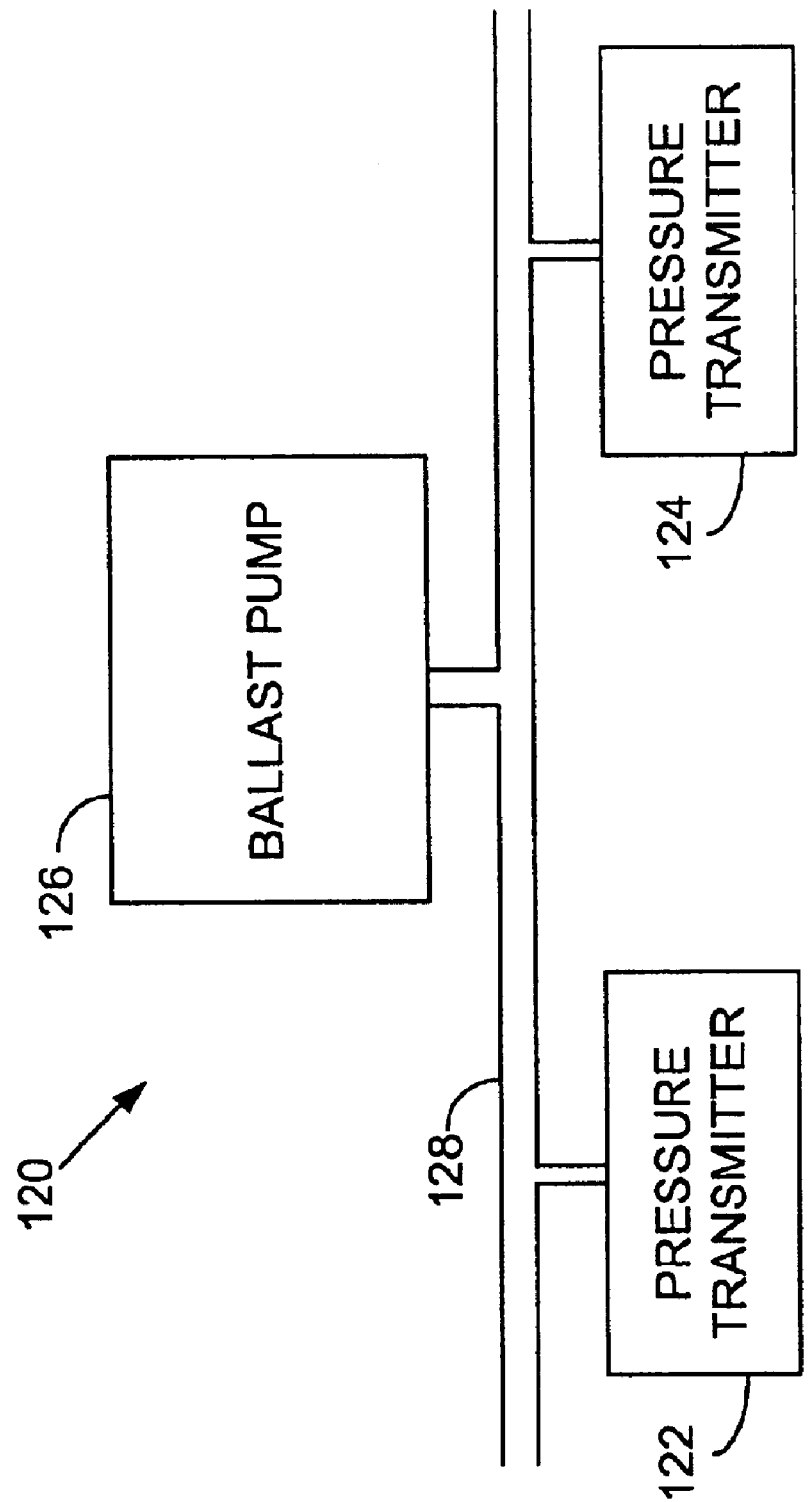

METHODS, APPARATUS, AND COMPOSITIONS FOR CONTROLLING ORGANISMS IN BALLAST WATER

CROSS-REFERENCE TO RELATED APPLICATION

This application claims priority to copending U.S. provisional applications entitled, "Method, Apparatus and Composition for Controlling Pathogens in Ballast Water," having Ser. No. 60/253,650, filed Nov. 28, 2000, and "Ballast Water Disinfection with Chlorine Dioxide," having No. 60/282, 542, filed Apr. 9, 2001, both of which are entirely incorporated herein by reference.

FIELD OF THE INVENTION

The present invention is generally related to treating ballast water and, more particularly, is related to an apparatus and method of treating ballast water contaminated with organisms with a biocide.

BACKGROUND

Every year the United States receives an estimated 80 million tons of ballast water. The ballast water comes from the practice in the shipping industry of ships pumping water into the ballast tanks system to balance the ship in the water. The ship requires balancing because the load (e.g. cargo) on the ship may not be equally dispersed throughout the ship. Once the ship is balanced, it travels to a new port and pumps out the ballast water, as required, to balance the ship after loading/unloading. In other words, ships necessarily transfer ballast water from one port and then discharge that ballast water at another port. In addition, the ballast water can come from ocean going vessels such as self unloading carriers, RO/RO carriers, ferries, and tug/barge combinations. Ballast water discharge has been known to contaminate coastal ecosystems and harbors. The contamination results from the ballast water carrying aquatic organisms and micro organisms such as pathogens, microbial species and more specifically V. cholera, *E. Coli*, Salmonella species, Crystosporidium species, Hepatitis A virus, enterovirus, etc.

In 1996, Congress passed the National Invasive Species Act (P. L. 104-332) to stem the spread of non-indigenous organisms by ballast water discharge. The Act requires the Secretary of Transportation to develop national guidelines to prevent the spread of organisms and their introduction into U.S. waters via ballast water of commercial vessels. The Act establishes guidelines that require that vessels that enter U.S. waters after operating undertake ballast exchange in the high seas. In this method, a vessel empties its ballast on the high seas and refills the ballast tanks with sea water. However, the emptying of ballast tanks causes an imbalance that makes the exchange of ballast water exchange on the high seas both dangerous and sometimes impossible because of weather conditions. Additionally, high seas exchange requires manpower that many vessels do not have or cannot economically provide.

Many attempts to develop suitable methods for treating ballast water of ships have been proposed, but all of these are ineffective in treating the wide variety of organisms found in ballast water. Additionally, many proposed biocides are harmful to the environment due to toxic by-products, and/or have high operation costs. In particular, ultra violet radiation techniques have been used in trials, but this technique is not effective for many organisms and has been found to be ineffective in turbid water. In addition to ultraviolet irradiation, ozonation has been used in trials as a biocide, but ozonation of ballast water is complex and very expensive. Other chemicals, such as hypochlorite, have been used as a biocide, but hypochlorite forms dangerous organochlorine compounds and is corrosive to the ballast tanks of the vessel.

An additional problem for many of the other biocides is the formation of the bromate ion as a by-product. Many biocides, such as ozone, hypobromous acid, and hydrogen peroxide, produce bromate ions due to their high oxidative reduction potential. The bromate ion is known to be a carcinogenic to humans and is very toxic to marine animals. This poses a problem for the bodies of water receiving ballast water treated with these chemical.

A further problem with other biocides is that they are not effective in treating biofilms. This is important because biofilms may have 500–500,000 bacterium attached to its surface for every bacterium found in bulk ballast water. In this regard, biofilms contain many target organisms and, therefore, need to be treated to kill the target organisms living in the biofilm.

Thus, a heretofore unaddressed need exists in the industry to address the problem associated with treatment and discharge of ballast water.

SUMMARY OF THE INVENTION

Briefly described, the present invention provides a ballast water treatment system. The ballast water treatment system includes a control system and a ballast tank system. The control system controls the concentration of a biocide in the ballast tank system.

In addition, the present invention provides a vessel that includes a control system, a biocide generation system, and a ballast tank system. The control system is capable of controlling the concentration of a biocide in the ballast tank system by controlling the amount of the biocide feed into the ballast tank system from the biocide generation system.

The present invention also involves methods for controlling organisms in ballast water of a vessel. A representative method includes providing the ballast water, and treating the ballast water with chlorine dioxide.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 1A–1C illustrate Tables 1–3 that compare chlorine dioxide to other proposed biocides.

FIG. 3 is a schematic that illustrates a representative embodiment of the water flow system in the water intake system as shown in FIG. 2B.

FIG. 9 is a flow diagram that illustrates a representative embodiment an organism control system shown in FIGS. 2B, 5 and.

DETAILED DESCRIPTION

Figure 2A:
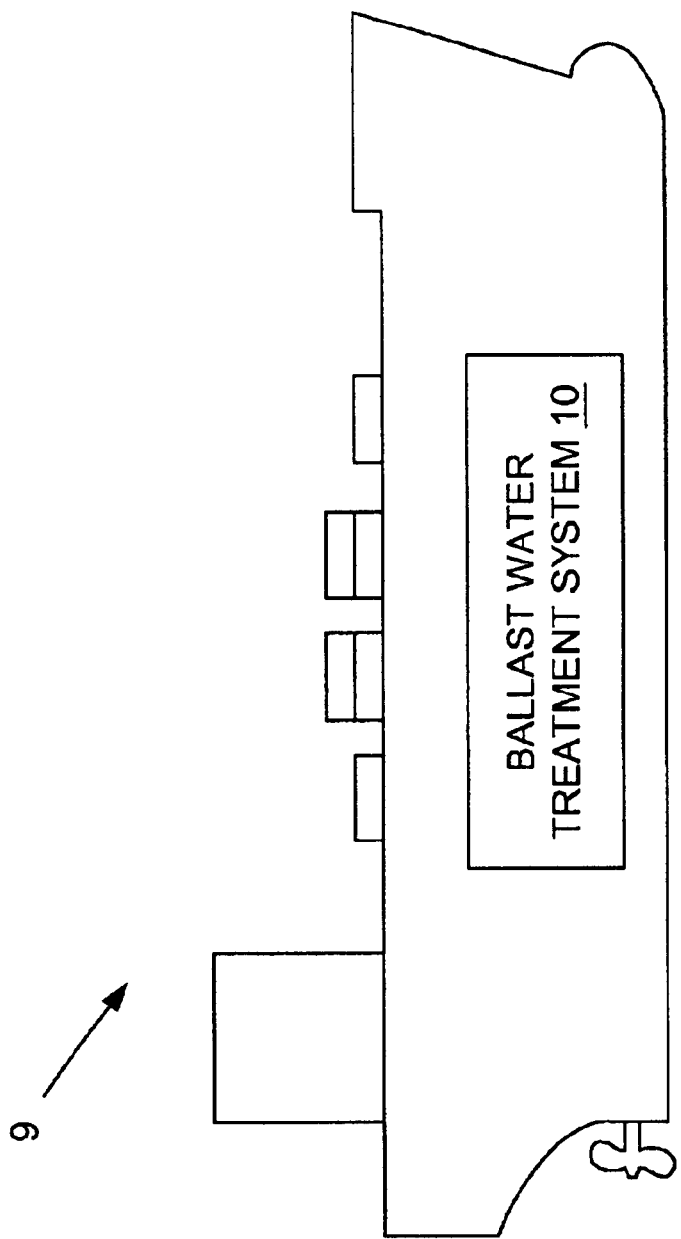
FIG. 2A is a schematic that illustrates a representative embodiment of a vessel that incorporates the ballast water treatment system.

The present invention provides methods, apparatuses, and computer systems for treating, monitoring, and controlling the concentration of a biocide in ballast water. In general, the ballast water treatment system of the present invention uses a biocide (e.g. chlorine dioxide) to treat the ballast water for unwanted and potentially harmful organisms. The ballast water treatment system facilitates treating the ballast water with a biocide, controlling the concentration of the biocide, and controlling the organisms present in the ballast water.

Embodiments of the ballast water treatment system are advantageous because they are capable of the bio-kill of a wide variety of organisms and spores, even if the organisms and/or spores are within a biofilm. In addition, the preferred biocide, chlorine dioxide, does not produce harmful bromate ions (as a by-product) or harm the structural integrity of ballast tank system. Thus, the ballast water treatment system may overcome some of the disadvantages of other biocides used to treat ballast water.

Furthermore, the ballast water treatment system can be implemented onboard a vessel or the ballast water treatment system can be implemented at a location remote from the vessel. In addition, the some aspects of the ballast water treatment system can be implemented onboard the vessel, while other aspects of the ballast water treatment system can be implemented at a remote location from the vessel. For example, the ballast water can be pumped from the vessel to a treatment facility to be treated.

The biocide used to treat the organisms present in the ballast water include, but are not limited to, chlorine dioxide. FIGS. 1A–1C include tables that illustrate comparisons of chlorine dioxide and other biocides that have been proposed to treat ballast water. These tables illustrate the advantages that chlorine dioxide has over many other proposed biocides. These comparisons include comparisons based on efficacy against microbes, microbial range, contact time, concentration needed to be effective, pH needed to be effective, efficacy against biofilms that have microbes therein, corrosiveness, biodegradability, cost, and other comnents. Clearly the tables demonstrate many of the advantages that chlorine dioxide has over various other proposed biocides.

Further, chlorine dioxide is environmentally friendly and the decomposition products of chlorine dioxide are Generally Regarded As Safe (GRAS). Chlorine dioxide is fast acting and effective in the disinfection of water sources. Chlorine dioxide has been used for many years to purify municipal water sources. The EPA has approved chlorine dioxide as a disinfectant for drinking water. Chlorine dioxide is desirable due to its effectiveness in contaminated environments as well as in waters containing high salt contents, such as the sea-water in ballast tanks. Chlorine dioxide is an effective biocide that can be used against a large diversity of aquatic organisms (as described below). The organisms can not form resistance to chlorine dioxide, so there is no need to alternate biocides. In addition, the residual chlorine dioxide in the ballast water can be quenched using ascorbic acid or other appropriate quenching treatment so that chlorine dioxide is not discharged into the environment.

As used hereinafter, organisms includes viable and potentially invasive aquatic species such as, for example, plankton, phytoplankton, zooplankton, microbial organisms, nekton organisms, benthic organisms, etc. Phytoplankton (e.g. predominantly drifting plant life forms) includes the photosynthetic species such as the prevailing groups of algae, diatoms, and dinoflagellates, as well as their cyst and spore stages. Zooplankton includes drifting animal species that include everything from copepods, jellyfish, and shrimp to a broad range of macrovertebrate and macroinvertebrate egg and larval stages. Even more numerous is the broad range of microbial forms, including pathogenic bacteria that are of great public health concern. The nekton or free-swimming organisms, dominated by the fishes, are also brought on board during the loading of ballast waters. Benthic organisms living on the bottom (e.g. epifauna and epiflora) or within the surface of seabed sediments (e.g. infauna such as crabs, shellfish, and worms) are also incorporated into the ballast water intake when loading is conducted in shoal waters, because of the turbulence immediately outside of the ships' hull. Suspended sediments also comprise a significant portion of the ballast water intake in many shallow water and port facility locations.

Once this broad spectrum of organisms and sediments is held within the ballast tank system of a vessel, biofilms are known to develop and harbor very large populations of great microbial complexity. Each exchange of ballast water provides nutrients and potentially new member for the vessel's own biofilm community that grows on the inner walls of the ballast water tanks and associated piping.

Chlorine dioxide is the chemistry of choice for controlling spore-forming organisms, which are the most difficult to control and identify. In addition, chlorine dioxide is an effective biocide for treating biofilms. Furthermore, chlorine dioxide will not harm either the base metal of vessels or the protective coatings they may have lining the ballast tanks when chlorine dioxide residual is effectively monitored and controlled.

Now referring to again to the figures, FIG. 2A is a schematic that illustrates a vessel 9 that includes a ballast water treatment system 10. The vessels 9 that can implement the ballast water treatment system 10 include, but are not limited to, ships (freshwater and salt water), self unloading carriers, RO/RO carriers, ferries, tug/barge, submarines, etc. The ballast tank system 60 is located onboard the vessel 9. The ballast tank system 60 includes ballast tanks, interconnecting tubing, inflow/outflow system, etc.

Figure 2B:
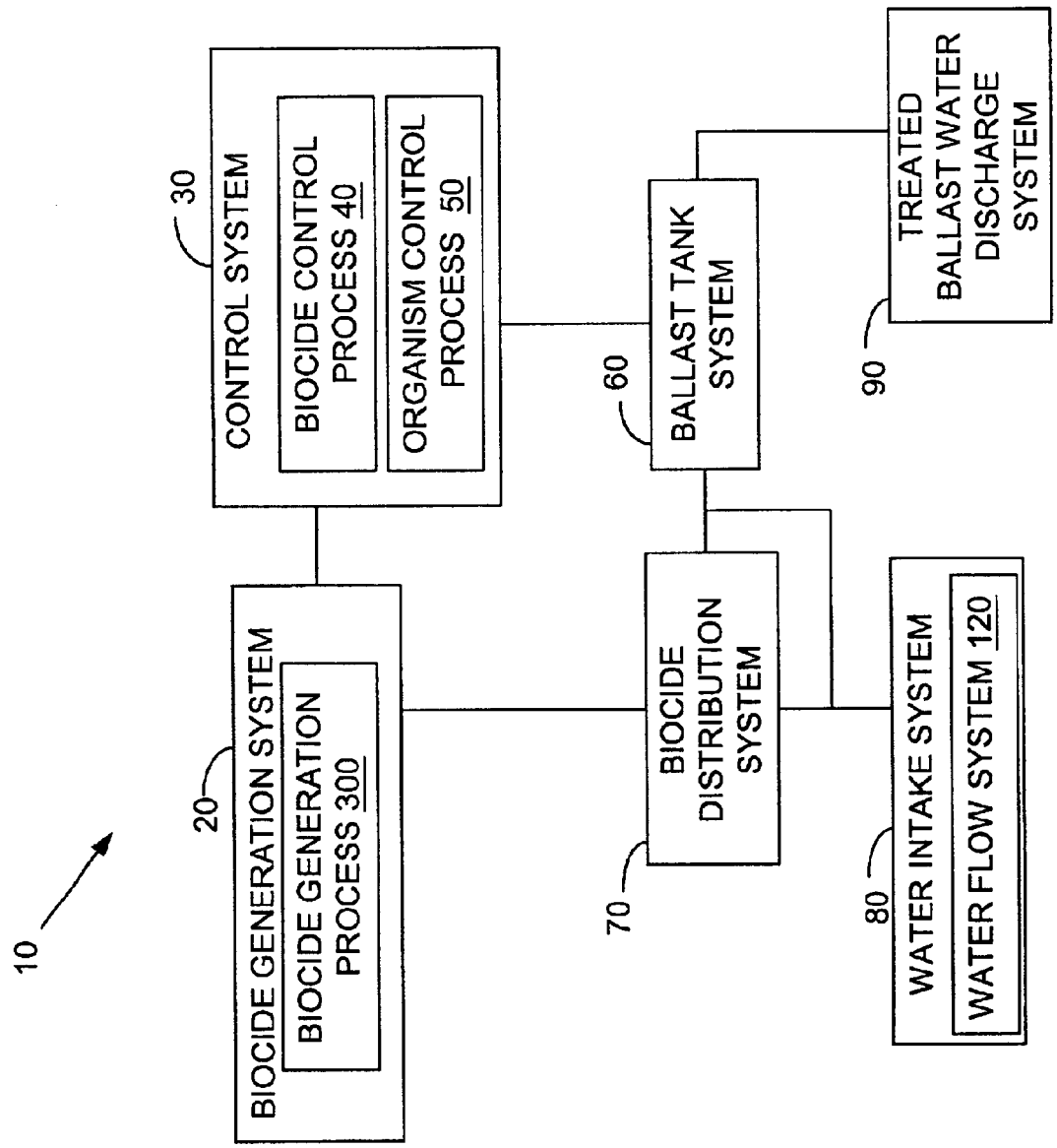
FIG. 2B is a schematic that illustrates a representative embodiment of the ballast water treatment system as shown in FIG. 2A.

FIG. 2B is a schematic that illustrates an embodiment of the ballast water treatment system 10. The ballast water treatment system 10 includes a biocide generation system 20, a control system 30, a ballast tank system 60, biocide generation system 70, a water intake system 80, and a treated ballast water discharge system 90.

Reference will now be made to the flow diagram of FIG. 2C, which illustrates a representative embodiment of the ballast water treatment system 10. In this regard, each block of the flowchart represents a module segment, portion of code, or logic circuit(s) for implementing the specified logical function(s). It should also be noted that in some alternative implementations the functions noted in various blocks of FIG. 2C, or any other of the accompanying flowcharts, may occur out of the order in which they are depicted. For example, two blocks shown in succession in FIG. 2C may, in fact, be executed substantially concurrently. In other embodiments, the blocks may sometimes be executed in the reverse order depending upon the functionality involved.

Figure 2C:
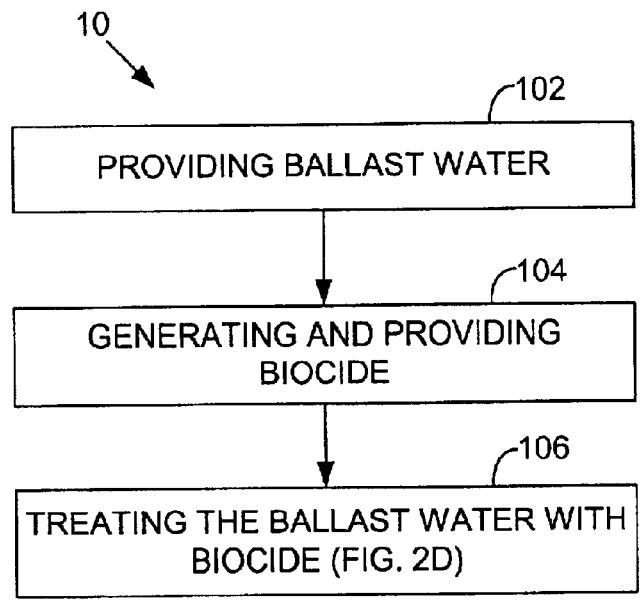
FIG. 2C is a flow diagram that illustrates a representative embodiment of the ballast water treatment system shown in FIG. 2B.

FIG. 2C is a flow diagram that illustrates an example of the functionality of the ballast water treatment system 10. The ballast water treatment system 10 provides ballast water via the water intake system 80, as shown in block 102. In this regard, the bulk of the ballast water can be transferred to the ballast tank system 60, while a portion of the ballast water is transferred to the biocide distribution system 70 and/or the biocide generation system 20. The biocide generation system generates and provides the biocide that is to be used by the ballast water treatment system 10 to treat the ballast water, as shown in block 104. The biocide generation system 20 can include a chemical storage module. The chemical storage module can include one or more precursor chemical tanks, a biocide generator, an intake system, and discharge system. The precursor chemical tanks, the biocide generator, the intake system, and the discharge system can be interconnected using piping and tubing technologies. The biocide can be generated from chemicals on board the vessel 9 or can be produced at a location remote from the vessel 9.

Subsequently, the ballast water treatment system 10 treats the ballast water with the biocide, as shown in block 106. In this regard, the biocide can be introduced into the ballast tank system 60 through the biocide distribution system 70. The biocide distribution system 70 includes piping, pumps, etc. that enable the transport of the biocide to the ballast tank system 60. After substantial bio-kill of the organisms in the ballast water is complete, the treated ballast water can be discharged using the treated ballast water discharge system 90.

Figure 2D:
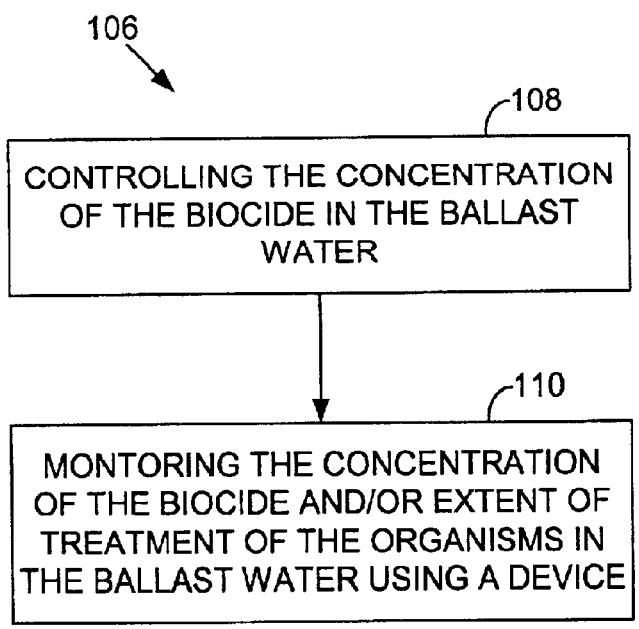
FIG. 2D is a flow diagram that illustrates a representative embodiment an aspect of the ballast water treatment system illustrated in FIG. 2C.

FIG. 2D is a flow diagram that illustrates an example of the functionality of treating the ballast water with biocide as shown in FIG. 2C. In this regard, the control system 30 is capable of controlling the biocide concentration in the ballast tank system 60, as shown in block 108. The control system 30 controls the concentration of the biocide by monitoring parameters, discussed below, and uses those parameters to determine the concentration of the biocide and/or the extent of treatment of the organisms using one or more measuring devices, as shown in block 110. In this regard, the control system 30 can process the parameters to determine the appropriate measures (e.g. adjust the concentration of the biocide) to be taken to achieve substantial bio-kill of organisms in a ballast tank system 60.

As indicated above, sea or fresh ballast water can be introduced into the ballast tank system 60 via the water intake system 80. The ballast water can be filtered (not shown) before entering the ballast tank system 60 to enhance treatment. The optional filter system includes, but is not limited to, a cyclonic separation system and any other appropriate filtering system that functions to enhance the treatment of the ballast water.

In a preferred embodiment, the water intake system 80 includes a water flow process 120 that is capable of measuring the flow of ballast water into the ballast tank system 60 as shown in FIG. 3. The water flow process 120 includes a pair of pressure transmitters 122 and 124 that are interconnected to one or more ballast tank pumps 126 (e.g. main intake ballast pumps). The ballast pump 126 is capable of flowing (e.g. pumping or flooding) ballast water into the ballast tank system 60 via an intake pipe 128. The pressure transmitters 122 and 124 are located on the input and output side of the ballast pump 126 and measure the pressure on each side of the ballast pump 126. The pressure can be correlated to the flow rate of the ballast water into the ballast tank system 60. Thereafter, the flow of the ballast water can be used to determine an effective amount of chlorine dioxide that is to be added to the ballast water (as discussed in FIG. 4 below) to achieve a predetermined concentration of residual chlorine dioxide in the ballast water (e.g. about 0.1 to about 10 ppm).

Figure 4:
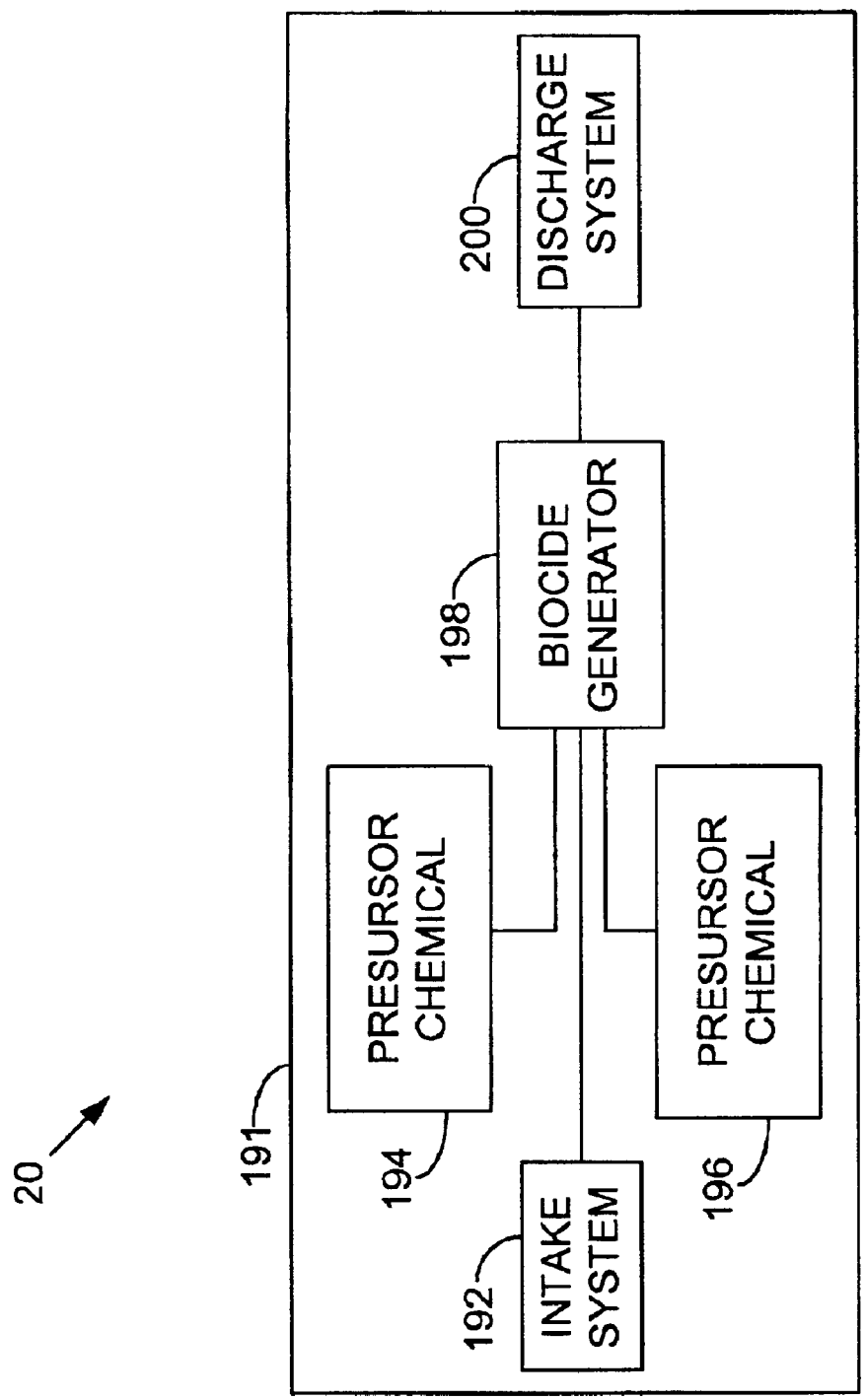
FIG. 4 is a schematic that illustrates a representative embodiment of the biocide generation system shown in FIG. 2B.

FIG. 4 is a schematic of an illustrative modular example of a biocide generation system 20 as shown in FIG. 2B. In this embodiment, the biocide generation system 20 includes a chemical storage module 191, an intake system 192, precursor chemical tanks 194 and 196, a biocide generator 198, and a discharge system 200. The chemical storage module 191 can be made of fireproof and/or waterproof material. The precursor chemical tanks 192 and 194 and the biocide generator 198 can be constructed of material (e.g. plastic, steel, etc.) that can store each type of chemical. In addition, the biocide generator 198 can mix and/or store the generated biocide.

As indicated above, the interconnecting piping connects the intake system 192 to precursor chemical tanks 194 and 196. The intake system 192 is interconnected to the water intake system 80 and/or the biocide distribution system 70. The motive water flowing through the intake system 192 causes the precursor chemicals to flow into the biocide generator 198, where the precursor chemicals react to form the biocide. Thereafter, the biocide can be stored or can be transferred out of the biocide generation system 20 via the discharge system 200. The discharge system 200 is interconnected to the biocide distribution system 70 or directly interconnected to the ballast tank system 60.

In one embodiment of the biocide generation system 20 uses a vacuum (e.g. generated by using a Venturi style vacuum system) interconnected to precursor chemical tanks 194 and 196. The Venturi style vacuum system is capable of generating a sufficient vacuum to pull the necessary chemicals from the two precursor chemical tanks 194 and 196 into the biocide generator 198. In the biocide generator 199, the precursor chemicals are reacted to form the biocide. Thereafter, the biocide can be stored for future use. The flow of each of the precursor chemicals is capable being controlled by a flow system (not shown) that is controlled by the biocide generation system 20 to ensure proper reaction efficiency. In addition, the flow can be controlled using a manual system or other appropriate flow system. For example, traditional vacuum or pump systems can be used instead of a Venturi style vacuum system.

The biocide can be generated onboard the vessel 9 or generated at a remote location. In particular, if the biocide is chlorine dioxide, then the chlorine dioxide must be generated and used before deterioration occurs because chlorine dioxide is not stable for long periods of time. When the biocide is generated onboard the vessel 9, the appropriate chemicals are reacted in the biocide generation system 20 to produce the biocide. Alternatively, when the biocide is generated remotely from the vessel 9, the biocide can be transferred to the biocide distribution system 70 or directly transferred into the ballast tank system 60.

For example, the biocide can be generated on a second vessel that is in close proximity to the first vessel 9 and the biocide is transported onto the first vessel 9 via transfer lines or storage tanks. Another example includes generating the biocide onshore and then transporting the biocide onto the vessel 9 via transfer lines or storage tanks.

As indicated above, the preferred biocide is chlorine dioxide. There are a number of chemical processes that can be used to generate chlorine dioxide in the biocide generation system 20. Each of these different techniques for generating chlorine dioxide can be performed onboard the vessel 9 or at a remote location from the vessel 9.

In one embodiment, the biocide generation system 20 can be used to generate chlorine dioxide in real-time from a process that uses sodium chlorite. The chlorine dioxide can be generated from the sodium chlorite by one or more of the following reaction techniques: acidification of chlorite, oxidation of chlorite using chlorine gas, oxidation of chlorite by persulfate, action on acetic acid on chlorite, reaction of sodium hypchlorite and sodium chlorite, electrochemical oxidation of chlorite, reaction of dry chlorine and chlorite, etc.

Another embodiment the biocide generation system 20 can be used to generate chlorine dioxide using a chlorate process. The chlorine dioxide can be generated from sodium chlorate by one or more of the following reaction techniques: reduction of chlorate by acidification in the presence of oxalic acid, reduction of chlorate by sulfur dioxide, ERO R-2® and ERO R-3® processes, ERO R-5® process, ERO R-8® and ERO R-10® processes, ERO R-11® process, etc.

One or more of these processes can be used by the biocide generation system 20 to generate chlorine dioxide. It should be noted that other chemical processes for producing chlorine dioxide can be used in embodiments of the present invention and the techniques of producing chlorine dioxide listed above are merely illustrative of some of the chemical processes that can be used to produce chlorine dioxide using the biocide generation system 20. It should also be noted that other chemicals such as, for example, but not limited to, those listed in FIGS. 1A–1C can be used with control system 30, ballast tank system 60, water intake system 80, biocide generation system 70, and treated ballast water discharge system 90.

As discussed above, a monitoring device can be used in the control system 30 to determine if substantial bio-kill has been completed and the risk of discharging organisms has been decreased to within levels consistent with local, state, federal, and international regulations. The monitoring devices can include, for example, an oxidation-reduction probe, pH probe, a timer, biocide residual reading probe, or other appropriate signal generating device. Monitoring devices, as those discussed above, can be placed in one or more of the ballast tanks and also in other strategic positions within the interconnecting pipe system and ballast water transfer pumps of the ballast tank system 60. Further, a plurality of different kinds monitoring devices can be placed in one or more ballast tanks and other strategic positions to provide additional information.

The monitoring devices are capable sending signals to the control system as data for determining the amount, if any, of biocide that needs to be fed into the ballast tank system 30. This data, as well as other data discussed above, can be acquired by the control system 30 and used to control the concentration of the residual biocide in the ballast tank system 60.

The preferred monitoring device is an oxidation-reduction potential probe (ORP). The OPR is capable of determining the level of an oxidizing agent (e.g., residual chlorine dioxide) present in the ballast water. The ORP probe is also capable of determining the ongoing oxidation potential in the ballast water, which can be directly correlated to the chlorine dioxide residual. The ORP probe is capable of monitoring the decay/saturation of the chlorine dioxide residual of the ballast water being maintained in the ballast tanks. This should ensure that the receiving body of water is not affected by trace amounts of the chlorine dioxide residual. The ORP probe is capable of sending a signal that can be used to determine the amount, if any, of chlorine dioxide that needs to be added into the ballast tank system 60. Examples of signals include, for example, a signal that corresponds to the level of oxidizing agent, the ongoing oxidation potential, and the decay of the chlorine dioxide residual.

Figure 5:
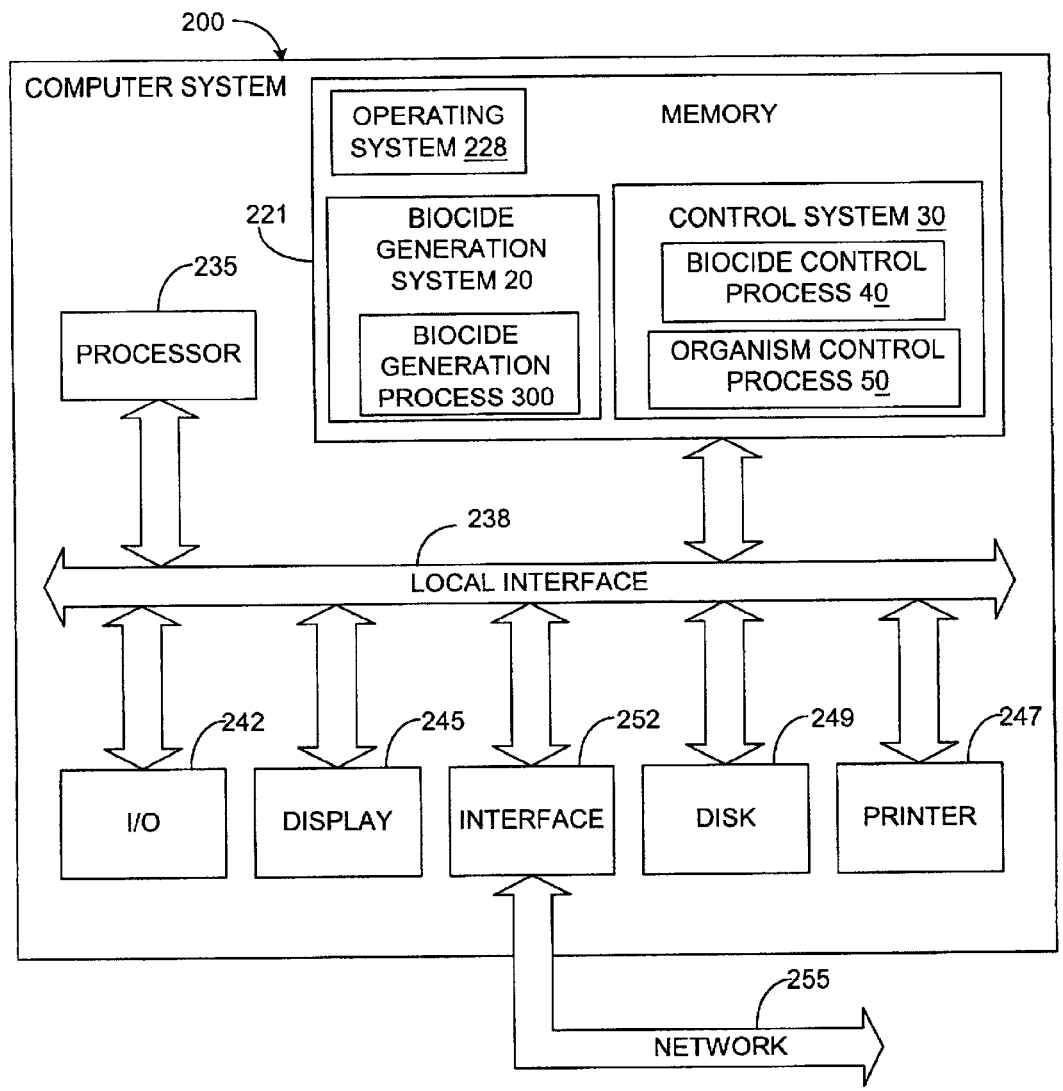
FIG. 5 is a schematic that illustrates a representative embodiment of the ballast water treatment system implemented shown in FIG. 2B using a computer system.

The ballast water treatment system 10 of the present invention can, in part, be implemented into a computer system 200 as shown in FIG. 5. In this regard, the ballast water treatment system 10 includes a biocide generation system 20 and a control system 30 as shown in FIG. 2B. The biocide generation system 20 and a control system 30 can be implemented in software (e.g., firmware), hardware, or a combination thereof. The biocide generation system 20 and a control system 30 can included in a special or general purpose digital computer or a processor-based system (hereinafter computer system 200) that can implement the biocide generation system 20 and a control system 30.

Generally, in terms of hardware architecture, as shown in FIG. 5, the computer system 200 includes a processor 235, memory 221, input /output device (I/O), display 245, interface 252, disk drive 246, and a printer 247, that are communicatively coupled via a local interface 252. The local interface 252 can be, for example, one or more buses or other wired or wireless connections, as is known in the art. The local interface 252 may have additional elements, which are omitted for simplicity, such as controllers, buffers (caches), drivers, repeaters, and receivers, to enable commnunications. Further, the local interface may include address, control, and/or data connections to enable appropriate communications among the aforementioned components.

The computer system 200 may be interfaced to one or more devices, such as another computer, printer, or server, through the interface 252 via a network 255. The network 255 can be one or more networks capable of enabling the above components to communicate and may include, for example, local area network (LAN), wireless local area network (WLAN), a metropolitan area network (MAN), a wide area network (WAN), any public or private packet-switched or other data network, including the Internet, circuit-switched networks, such as the public switched telephone network (PSTN), wireless networks, or any other desired communications infrastructure.

The processor 235 is a hardware device for executing software, particularly that stored in memory 221. The processor 235 can be any custom made or commercially available processor, a central processing unit (CPU), an auxiliary processor among several processors associated with the computer system 200, a semiconductor based microprocessor (in the form of a microchip or chip set), a macroprocessor, or generally any device for executing software instructions.

The memory 221 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 221 may incorporate electronic, magnetic, optical, and/or other types of storage media. Note that the memory 221 can have a distributed architecture, where various components are situated remote from one another, but can be accessed by the processor 235.

The software in memory 221 may include one or more separate programs, each of which comprises an ordered listing of executable instructions for implementing logical functions. In the example of FIG. 5, the software in the memory 221 includes the biocide generation system 20, which includes the biocide generation process 300; the control system 30, which includes the biocide control process 40 and the organism control process 50; and a suitable operating system 228 (O/S). The operating system 228 essentially controls the execution of other computer programs, such as the biocide generation system 20, the control system 30, the biocide control process 40, the organism control process 50, and the biocide generation process 300, and provides scheduling, input-output control, file and data management, memory management, and communication control and related services.

The biocide generation system 20, the control system 30, the biocide control process 40, the organism control process 50, and the biocide generation process 300 can be a source program, executable program (object code), script, or any other entity comprising a set of instructions to be performed. When a source program, then the program may need to be translated via a compiler, assembler, interpreter, or the like, which may or may not be included within the memory 221, so as to operate properly in connection with the O/S 228. Furthermore, the biocide generation system 20, the control system 30, the biocide control process 40, the organism control process 50, and the biocide generation process 300 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The computer system 200 may further include a basic input output system (BIOS) (omitted for simplicity). The BIOS is a set of essential software routines that initialize and test hardware at startup, start the O/S 228, and support the transfer of data among the hardware devices. The BIOS is stored in ROM so that the BIOS can be executed when the computer system 200 is activated.

When the computer system 200 is in operation, the processor 235 is configured to execute software stored within the memory 221, to communicate data to and from the memory 221, and to generally control operations of the computer system 200 pursuant to the software. The biocide generation system 20, the control system 30, the biocide control process 40, the organism control process 50, the biocide generation process 300, and the O/S 228, in whole or in part, but typically the latter, are read by the processor 235, perhaps buffered within the processor 235, and then executed.

When the biocide generation system 20, the control system 30, the biocide control process 40, the organism control process 50, and the biocide generation process 300 are implemented in software, as is shown in FIG. 5, it should be noted biocide generation system 20, the control system 30, the biocide control process 40, the organism control process 50, and the biocide generation process 300 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The biocide generation system 20, the control system 30, the biocide control process 40, the organism control process 50, and the biocide generation process 300 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, by way of optical scanning of the paper or other medium, then compiled, interpreted or otherwise processed in a suitable manner if necessary, and then stored in a computer memory.

In an alternative embodiment, where the biocide generation system 20, the control system 30, the biocide control process 40, the organism control process 50, and the biocide generation process 300 are implemented in hardware, the biocide generation system 20, the control system 30, the biocide control process 40, the organism control process 50, and the biocide generation process 300 can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As indicated above, the ballast water treatment system 10 includes a biocide generation system 20 and a control system 30. The following flow charts illustrate specific implementations of the biocide generation system 20, the control system 30, the biocide control process 40, the organism control process 50, and the biocide generation process 300. However, the following flow charts are only illustrative examples of how these systems and processes can be implemented using a computer system 200. One skilled in the art could implement these systems and processes separately on different computer systems, manually, etc. Thus, other embodiments of the ballast water treatment system 10 and related systems and processes are deemed to be included in this disclosure.

As indicated above, the ballast water treatment system 10 includes a biocide generation system 20. The biocide generation system 20 includes the biocide generation process 300, which can generate the biocide that is used to treat the ballast water. FIG. 4 illustrated an embodiment of the physical components of the biocide generation system 20, while FIG. 6 is a flow diagram illustrating the functionality of the biocide generation process 300.

Figure 6:
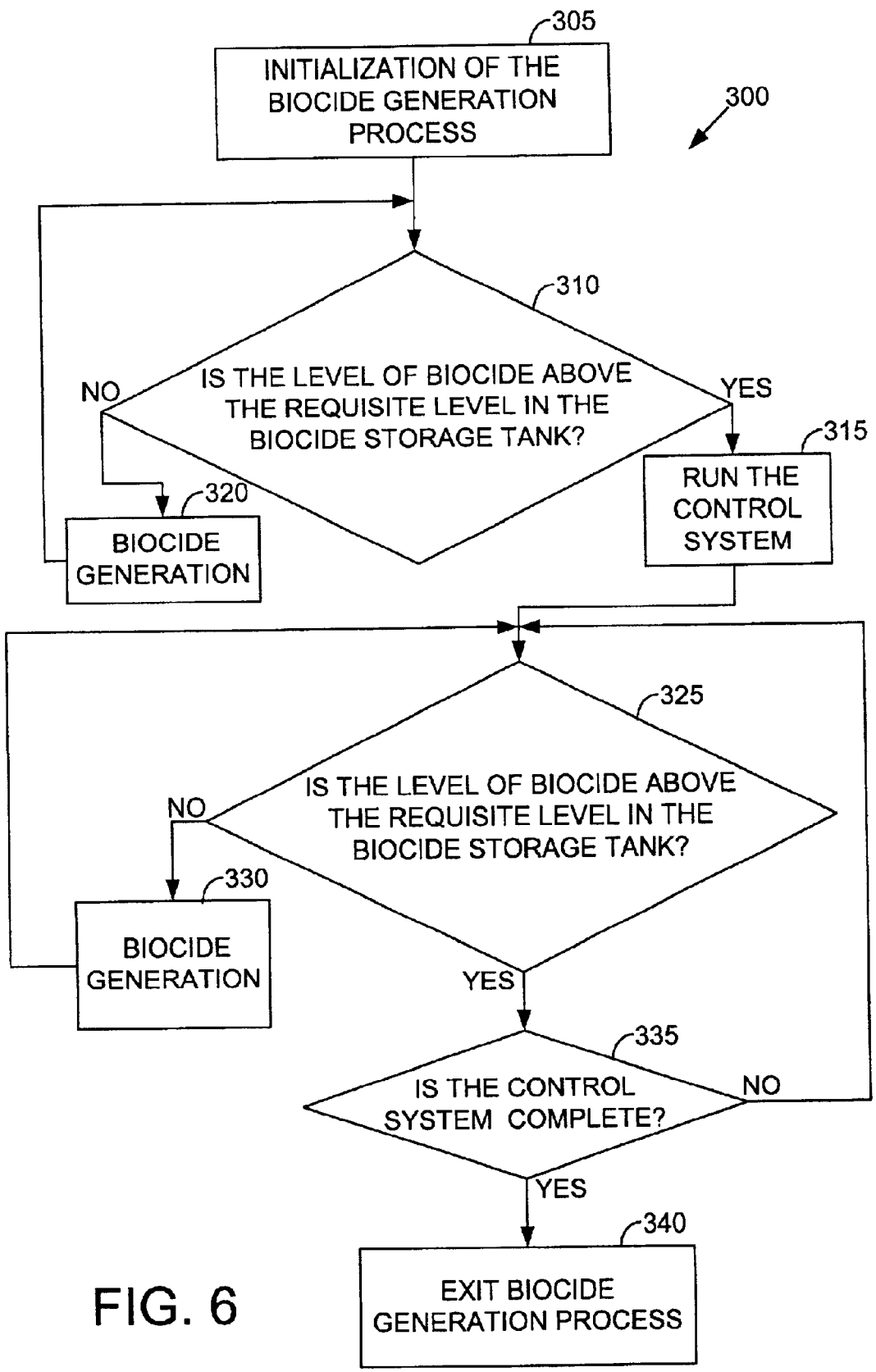
FIG. 6 is a flow diagram that illustrates a representative embodiment of a biocide generation process shown in FIGS. 2B and 5.

FIG. 6 illustrates the functionality of a representative embodiment of biocide generation process 300. First, the biocide generation process 300 is initialized, as shown in block 305. Then a determination may be performed to obtain if the level of biocide is above the requisite level in the biocide generator 198, as shown in decisional block 310. If the determination is "no," the biocide generation is initiated, as shown in block 320, and the biocide generation process 300 proceeds to block 310. If the determination is "yes," then the biocide generator 198 has the requisite amount of biocide needed to initiate the control system 30 and therefore, as shown in block 315, and proceeds to block 325.

Thereafter, a second determination is performed to obtain if the level of biocide is above the requisite level in the biocide generator 198 as the control system 30 uses biocide to treat the ballast water, as shown in decisional block 325. If the determination is "no," the biocide generation is again initiated, as shown in block 330, and proceeds to block 325. If the determination is "yes," a determination is performed to test if the control system 30 has completed substantial bio-kill of the organisms in the ballast water, as shown in decisional block 325. If the determination in block 335 is "no," the level of the biocide is determined again by proceeding to decisional block 310. However, if the determination in block 335 is "yes," the biocide generation process 300 is exited, as shown in block 340.

As indicated in FIG. 2B, the ballast water treatment system 10 also includes a control system 30. FIG. 2B illustrates an embodiment of the physical components of the control system 30, while FIG. 7 below is a flow diagram illustrating the functionality of the control system 30.

In general, the control system 30 controls the concentration of the biocide in the ballast water and concomitantly the treatment of the organisms in the ballast water. The control system 30 controls the concentration of the biocide in the ballast water by monitoring the concentration of biocide and/or organisms and adjusting the concentration of the biocide in the ballast water to achieve substantial biokill. The time period for treatment and concentration of the biocide will vary depending upon the constituents present in the ballast water and the type of ballast water. The control system 130 can be located on board or at a remote location from the vessel 9.

Figure 7:
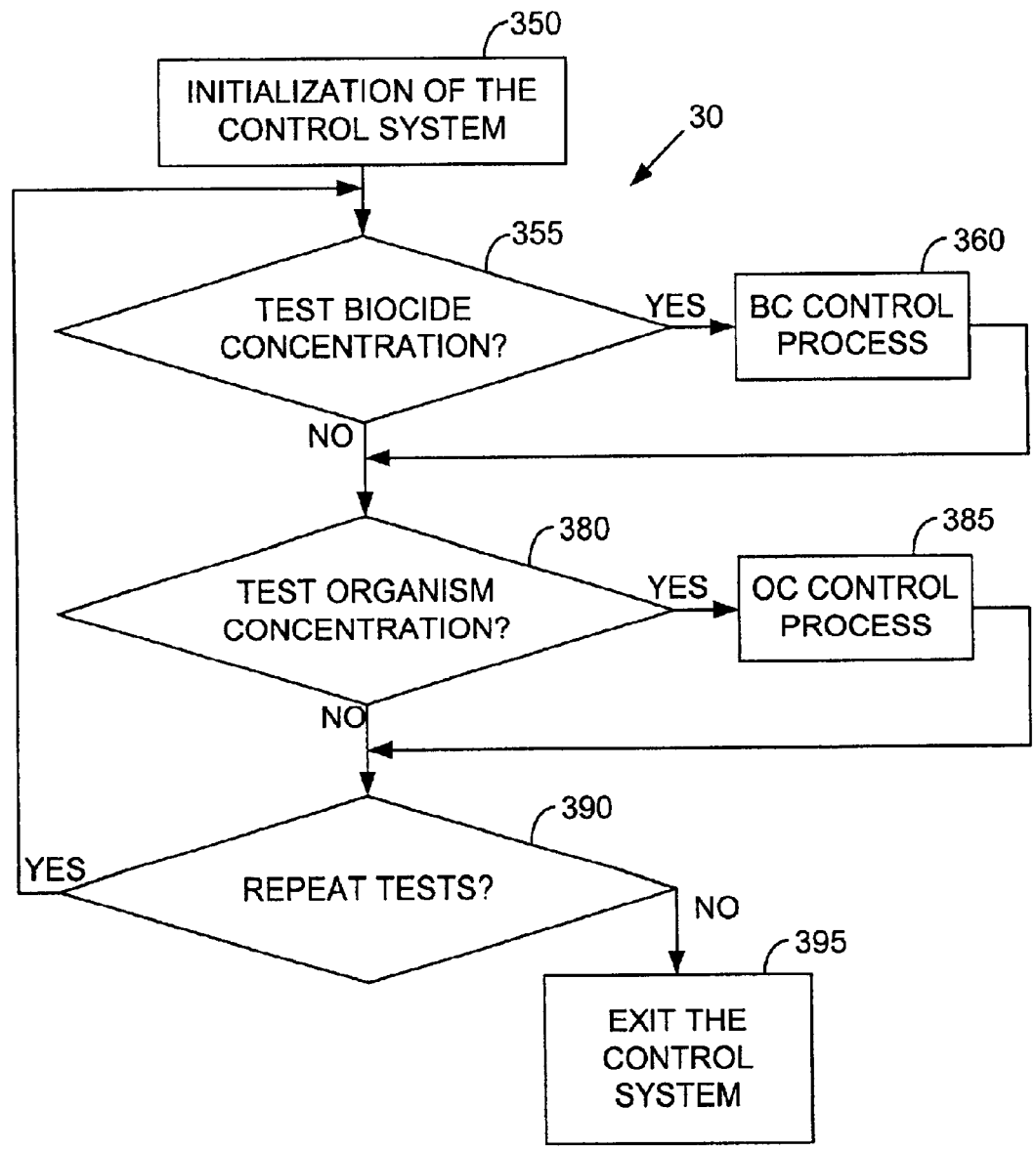
FIG. 7 is a flow diagram that illustrates a representative embodiment of a control system shown in FIGS. 2B and 5.

FIG. 7 illustrates the functionality of a representative embodiment of the control system 30. First the control system 30 is initialized, as shown in block 350, and then a determination is made to test for substantial bio-kill of the organisms in the ballast water by measuring the level of residual biocide in the ballast tank system 60, as shown in decisional block 355. If the determination is "yes," then the biocide control process 40 measures the residual biocide concentration, as shown in block 360, and proceeds to test organism concentration in block 380.

If the determination in decisional block 355 is "no," then a determination is made to test for substantial bio-kill of the organisms in the ballast water by measuring the concentration of one or more organisms, as shown in decisional block 380. If the determination in block 380 is "yes," then the concentration of the organism is measured by the organism control program 50 using a device, as shown in block 385, and proceeds to repeat tests in block 39. If the determination in block 380 is "no," then a determination is made if the one or more tests are to be repeated, as shown in decisional block 390. If the determination in block 390 is "yes," then the control system 30 returns to block 355 and proceeds in a manner as already described. However, if the determination is "no," then the control system 30 is exited, as shown in block 395.

As indicated above, the pre-determined time period is, at least partially, dependent upon the source of the native ballast water. For example, some types of native ballast water have larger percentages of constituents (e.g. organisms, silt, sediment, etc.). Therefore, the pre-determined time period may be dependent upon source of native ballast water. In this regard, the pre-determined time period can be reset by the user so that the time period is long enough to achieve substantial bio-kill of the organisms present in the ballast water.

The control system 30 includes a biocide control process 40, which controls the concentration of biocide in the ballast tank system 60; and an organism control process 50, which controls the concentration of the organisms in the ballast water tank system 60. The biocide control process 40 and the organism control process 50 can be operated together or separately. The control system 10 is capable of using information gathered from the biocide control process 40 and organism control process 50 to control the amount, rate, etc. of biocide being generated and fed into the ballast tank system 60.

The control system 30 acquires data that is provided from the biocide control process 40 and/or organism control processes 50. The data include, but are not limited to, concentration of biocide over time, rate of biocide treatment, period of biocide treatment, requirements needed for substantial bio-kill, concentration of organisms over time, rate of inflow of ballast water into the ballast tank system, volume of ballast water in the ballast tank system, ballast water intake rate, and similar data. Specific values for the volume of each ballast tank and the interconnecting lines/transfer pumps can be pre-determined to determine the overall volume of the ballast tank system 60. Other data that may be used by the control system 30 includes, but is not limited to, country/port bio-kill requirements/including either local or international legislation, types of organisms and requirements for substantial bio-kill, ballast water composition (e.g., salinity, temperature, etc.) and like data.

More particularly, the control system 30 is capable of treating the ballast tank system 60 according to particular relationships among various data sets. The control system 30 is capable of determining the relationship among the rate of biocide treatment, period of biocide treatment, requirements for substantial bio-kill of organisms, as well as other data, as described above, to provide for treatment of the ballast tank system 60. The requirements for substantial treatment of organisms can be determined for various types or combinations of organisms in various types of ballast water (e.g., sea/fresh water).

Figure 8:
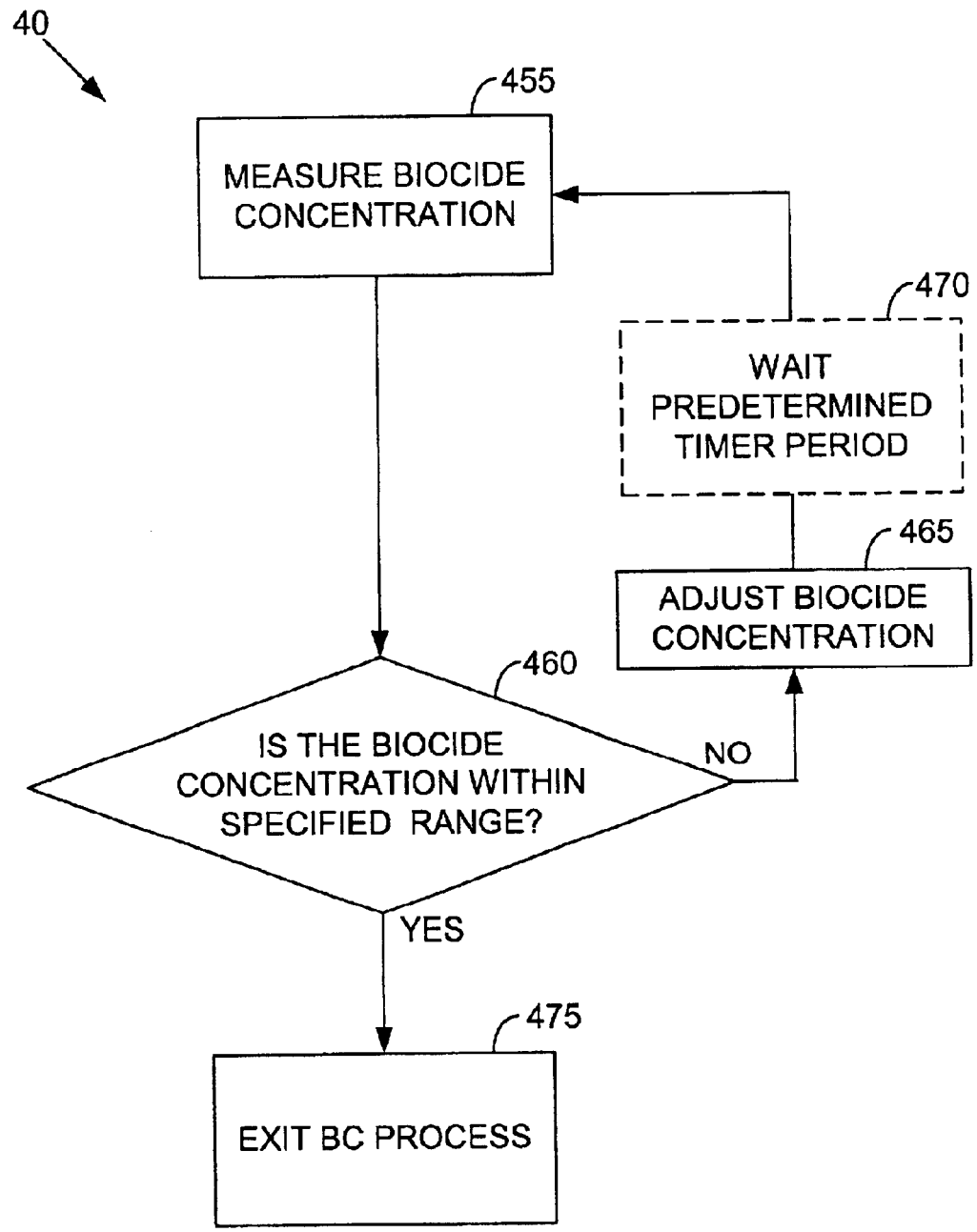
FIG. 8 is a flow diagram that illustrates a representative embodiment of a biocide generation process shown in FIGS. 2B, 5 and 7.

Now referring again to the figures, FIG. 8 is a flow chart that illustrates an example of the functionality of a representative embodiment of the biocide control (BC) process 40. Initially, the biocide concentration is measured by one or more devices (discussed below), as shown in block 455. Then a determination is made to obtain if the residual biocide concentration is within a pre-determined concentration range (e.g. about 0.1 to about 10 parts per million for chlorine dioxide), as shown in block 460. If the determination is "no," then the biocide concentration is adjusted, as shown in block 465. Then an optional step can be performed, where a pre-determined time period is allowed to pass before the biocide concentration is measured again, as shown in block 470. After the optional pre-determined time period has elapsed, the BC process 40 returns to block 455 and flows as discussed previously. However, if the determination in block 460 is "yes," then the BC process 40 is exited, as shown in block 475.

As indicated above, the pre-determined concentration range of residual biocide and the pre-determined time period are, at least partially, dependent upon the source of the native ballast water. For example, some types of native ballast water have larger percentages of constituents (e.g organisms, silt, sediment, etc.). Therefore, the pre-determined concentration range and the pre-determined time period can be reset in view of the source of native ballast water. In addition, the pre-determined concentration range of the residual biocide and the pre-determined time period can be reset by the user to treat the different types of ballast water and comply with local, state, federal, and/or international regulations. In this regard, the concentration of residual biocide and the length of the pre-determined time period should achieve substantial bio-kill of the organisms present in the ballast water.

As discussed previously, the BC process 40 is capable of controlling the concentration of biocide in the ballast tank system 60. The BC process 40 is capable of monitoring the concentration of biocide and adjusting the concentration of biocide to achieve substantial bio-kill. The BC process 40 can use one or more monitoring devices that are capable of measuring the levels of biocide present in ballast water in a ballast tank. In addition, the BC process 40 is capable of monitoring and controlling the biocide concentration in the ballast tank via the flow rate of the biocide into the ballast tank system 60. The BC process 40 is capable of monitoring various sets of data that relate, directly or indirectly, to the concentration of chlorine dioxide present in the ballast tank system 60.

In a preferred embodiment, the BC process 40 can use the flow of the ballast water into the ballast tank system 60, as obtained by the water flow process 120 in FIG. 3, to create a feedback loop for controlling the concentration of the chlorine dioxide. In this regard, the BC process 40 measures the concentration of residual chlorine dioxide in the ballast tank system 60 while the ballast water is flowed into the ballast tank system 60. If the residual concentration is not within a specified range (e.g., about 0.1 to about 10 ppm) then more chlorine dioxide is added to the ballast water flowing into the ballast tank system 60. Thus, a feedback loop can be constructed to control the concentration of the residual chlorine dioxide by monitoring the concentration in the ballast tank system 60 and adjusting the amount of chlorine dioxide added to the ballast water using this feedback loop to achieve the desired amount of residual chlorine dioxide.

Figure 9:
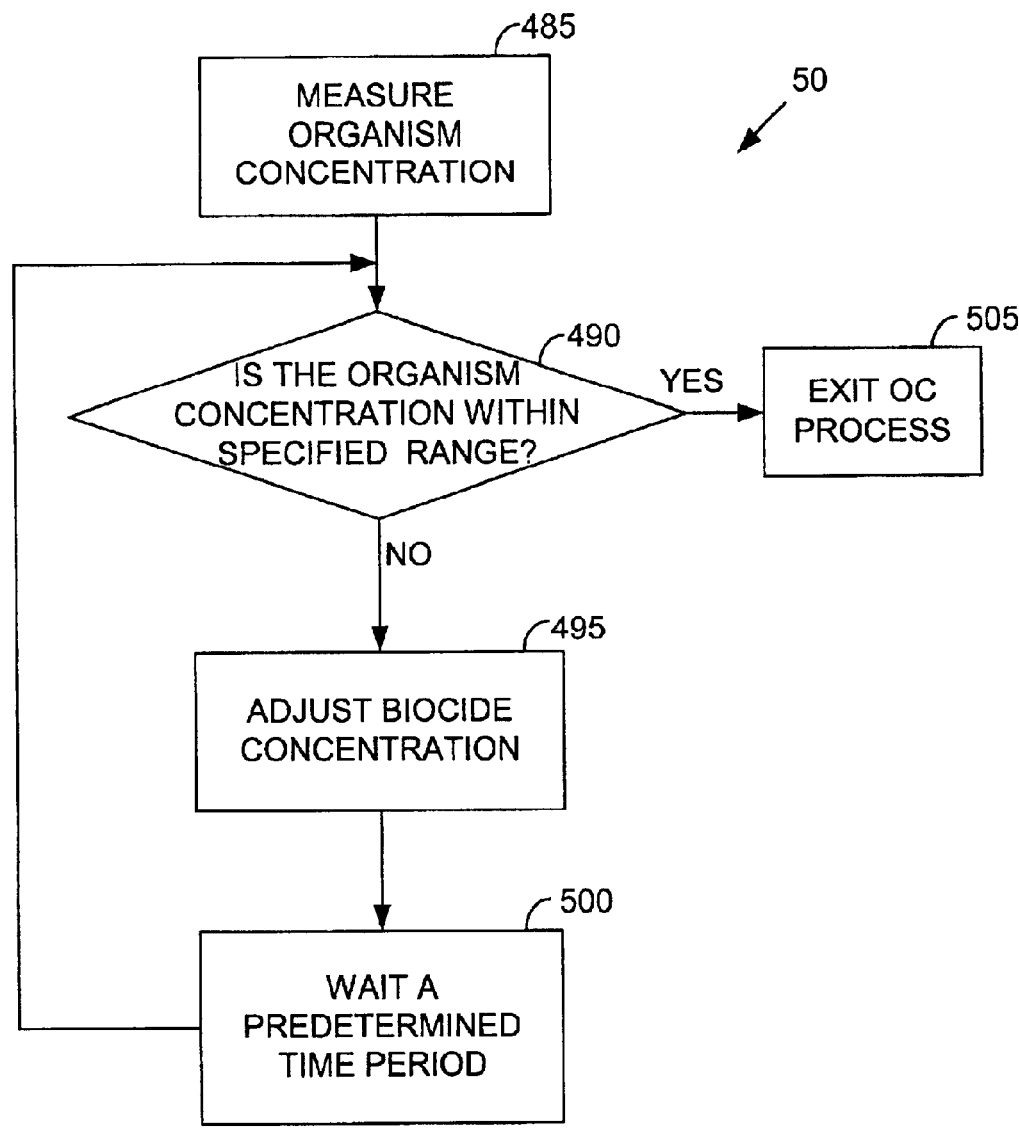

As indicated above, the control system 30 (FIG. 2B) includes the organism control (OC) process 50. FIG. 9 is a flow chart that illustrates the functionality of a representative embodiment of the OC process 50. First, the organism concentration is measured, as shown in block 485. Then a determination is made to ascertain if the concentration of the organism is within a pre-determined range (as mandated by state, federal law, and/or international regulations), as shown in decisional block 490. If the determination is "yes," then the OC process 50 is exited, as shown in block 505. If the determination in block 490 is "no," then the biocide concentration is adjusted, as shown in block 495. Then a pre-determined time period is allowed to pass before the concentration of the organism is measured again, as shown in block 500, and the OC process 50 returns to block 485.

The OC process 50 is capable of controlling the concentration of organisms present in the ballast tank system 60. The OC process 50 is capable of controlling the concentration of organisms by monitoring the ongoing concentration of one or more organisms before, during, and after treatment. More particularly, the OC process 50 is capable of controlling the organism concentration in each ballast tank (e.g. via an oxidative residual). The OC process 50 is capable of monitoring various sets of data that relate, directly or indirectly, to the concentration of organisms present in the ballast tank system 60. Monitoring devices can be placed in one or more of the ballast tanks and also in other strategic positions within the interconnecting pipe system of the ballast tank system 60. Further, a plurality of different kinds monitoring devices can be placed in one or more ballast tanks and other strategic positions to provide additional information. The monitoring devices are capable sending signals to the control system as data for determining the appropriate action, if any, needed to control organisms in the ballast tank system 60. This data, as well as other data discussed above, can be acquired by the control system 30 and used to control organisms using the OC process 50. The OC process 50 is capable of operating separately or in conjunction with the BC process 40 to control organisms.

As indicated above, the pre-determined concentration range of the organism and the pre-determined time period are, at least partially, dependent upon the source of the native ballast water. For example, some types of native ballast water have larger percentages of constituents (e.g. organisms, silt, sediment, etc.). In addition, the some types of organism are more difficult to measure (e.g those organisms present in biofilm). Therefore, the pre-determined concentration range of the organism and the predetermined time period can be reset in view of the source of native ballast water. In addition, the user can reset the concentration of the organism so that the concentration of the organism is low enough to satisfy local, federal, and/or international regulations. In addition, the user can reset the pre-determined time period so that the time period is long enough to allow the biocide to be effective to achieve substantial bio-kill of the organism.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A ballast water treatment system, comprising a control system and a ballast tank system, wherein the control system controls the concentration of a biocide in the ballast tank system, and wherein the biocide is chlorine dioxide.

2. The ballast water treatment system of claim 1, wherein the ballast water treatment system is implemented in a vessel.

3. The ballast water treatment system of claim 1 further comprising, a biocide generation system.

4. The ballast water treatment system of claim 1, wherein the control system comprises an organism control program, which is capable of controlling the concentration of the organism in the ballast tank system.

5. The ballast water treatment system of claim 1, wherein the control system comprises a biocide control program, which is capable of controlling the concentration of the residual chlorine dioxide in the ballast tank system.

6. The ballast water treatment system of claim 5, wherein the biocide control program includes an oxidation-reduction probe that is used to determine the concentration of residual chlorine dioxide.

7. A ballast water treatment system on a computer-readable medium for controlling organisms in ballast water of a vessel, comprising:
   logic configured to enable the ballast water to be provided; and
   logic configured to enable the ballast water to be treated with chlorine dioxide.

8. The ballast water treatment system of claim 7 further comprising:
   logic configured to enable the chlorine dioxide to be provided using a biocide generation system.

9. The ballast water treatment system of claim 7, further comprising:
   logic configured to enable the concentration of the chlorine dioxide to be monitored.

10. The ballast water treatment system of claim 7, further comprising:
    logic configured to enable the concentration of the chlorine dioxide to be controlled.

11. A method of controlling organisms in ballast water of a vessel, comprising:
    providing the ballast water; and
    treating the ballast water with chlorine dioxide.

12. The method of claim 11 further including,
    providing the chlorine dioxide using a biocide generation system.

13. The method of claim 12, wherein the biocide generation system is located onboard the vessel.

14. The method of claim 12, wherein the biocide generation system is located remote from the vessel.

15. The method of claim 11 further including:
    monitoring the concentration of the chlorine dioxide.

16. The method of claim 15, wherein the monitoring the concentration is performed using an oxidation-reduction probe.

17. The method of claim 15, wherein monitoring the concentration of the chlorine dioxide further comprises:
    monitoring the concentration of the chlorine dioxide in a treatment plant remote from the vessel.

18. The method of claim 11 further including:
    monitoring the ballast water to determine an extent of treatment of organisms in the ballast water.

19. The method of claim 18, wherein monitoring the ballast water to determine an extent of treatment of organisms in the ballast water further comprises:
    monitoring the ballast water to determine an extent of treatment of
    organisms in the ballast water in a treatment plant remote from the vessel.

20. The method of claim 11, wherein treating the ballast water with chlorine dioxide further comprises:
    treating the ballast water onboard the vessel.

21. The method of claim 11, wherein treating the ballast water with chlorine dioxide further comprises:
    treating the ballast water in a treatment plant remote from the vessel.

22. The method of claim 11 further including:
    controlling the concentration of the chlorine dioxide.

23. The method of claim 22, wherein controlling the concentration of the chlorine dioxide further comprises:
    controlling the concentration of the chlorine dioxide in a treatment plant remote from the vessel.

24. The method of claim 11 further comprising:
    determining a relationship among rate of chlorine dioxide treatment, period of chlorine dioxide treatment, and requirements for substantial biokill of organisms within the ballast water charged into the ballast tank system; and
    treating the ballast water according to said relationship.

25. A modular biocide generation system, comprising:
    a container that is fireproof and waterproof and includes:
      a plurality of precursor chemical storage tanks for storing precursor chemicals;
      a reaction tank for reacting the precursor chemicals where the reaction tank is connected to the plurality of precursor chemical storage tanks;
      an intake valve for receiving motive water, wherein the motive water is capable of creating a vacuum to facilitate the mixing of the precursor chemicals in the reaction tank to form a biocide; and
      a discharge valve for discharging the motive water and the biocide.

26. A system for controlling organisms in ballast water of a vessel, comprising:
    means for providing the ballast water; and
    means for treating the ballast water with chlorine dioxide.

27. The system of claim 26 further including:
    means for monitoring the concentration of the chlorine dioxide.

28. The system of claim 26 further including:
    means for controlling the concentration of the chlorine dioxide.

29. The system of claim 26 further including:
    means for monitoring the ballast water to determine an extent of treatment of organisms in the ballast water.

30. The system of claim 26 further including,
    means for providing the chlorine dioxide using a biocide generation system.

* * * * *